(12) United States Patent
Moran et al.

(10) Patent No.: US 12,008,898 B2
(45) Date of Patent: Jun. 11, 2024

(54) PARKING SPACE DETECTION METHOD AND SYSTEM

(71) Applicant: Municipal Parking Services, Inc., Minnetonka, MN (US)

(72) Inventors: Mark J. Moran, Woodbury, MN (US); Richard W. Kelley, II, Corcoran, MN (US); Marcus N. Schmidt, Minnetonka, MN (US)

(73) Assignee: Municipal Parking Services, Inc., Minnetonka, MN (US)

( * ) Notice: Subject to any disclaimer, the term of this patent is extended or adjusted under 35 U.S.C. 154(b) by 230 days.

(21) Appl. No.: 17/516,626

(22) Filed: Nov. 1, 2021

(65) Prior Publication Data
US 2022/0051560 A1 Feb. 17, 2022

Related U.S. Application Data

(63) Continuation of application No. 15/956,375, filed on Apr. 18, 2018, now Pat. No. 11,164,452, which is a
(Continued)

(51) Int. Cl.
| | |
|---|---|
| *G08G 1/04* | (2006.01) |
| *G01S 7/41* | (2006.01) |
| *G01S 13/04* | (2006.01) |
| *G01S 13/86* | (2006.01) |
| *G06T 7/00* | (2017.01) |

(Continued)

(52) U.S. Cl.
CPC ............... *G08G 1/04* (2013.01); *G01S 7/411* (2013.01); *G01S 13/04* (2013.01); *G01S 13/867* (2013.01); *G06T 7/0008* (2013.01); *G06T 7/13* (2017.01); *G06T 7/194* (2017.01); *G06V 20/52* (2022.01); *G08G 1/142* (2013.01); *G08G 1/147* (2013.01);
(Continued)

(58) Field of Classification Search
CPC ............ G08G 1/14; G06K 2009/00738; G01S 13/867; G06T 7/0008; G06T 2207/30264
See application file for complete search history.

(56) References Cited

U.S. PATENT DOCUMENTS

| | | | |
|---|---|---|---|
| 7,104,447 B1 * | 9/2006 | Lopez | G06Q 20/20 |
| | | | 705/13 |
| 2017/0101089 A1 * | 4/2017 | Bales | B60W 30/06 |
| 2017/0168155 A1 * | 6/2017 | Richard | G01S 13/325 |

FOREIGN PATENT DOCUMENTS

| | | |
|---|---|---|
| CN | 103065497 A | 4/2013 |
| CN | 103236188 A | 8/2013 |

(Continued)

*Primary Examiner* — Moazzam Hossain
(74) *Attorney, Agent, or Firm* — Skaar Ulbrich Macari, P.A.

(57) ABSTRACT

Disclosed are devices, systems and methods for managing parking monitoring and enforcement. In one aspect, a method of determining whether a vehicle is present in a parking space includes monitoring the parking space with a first vehicle detection technique utilizing image processing and monitoring the parking space with a second vehicle detection technique that does not utilize image processing. The parking space can be monitored with a third vehicle detection technique that is different than the first and second vehicle detection techniques. A conclusion that a vehicle has entered or left the parking space can be determined upon a agreement of the multiple techniques employed.

20 Claims, 9 Drawing Sheets

Related U.S. Application Data continuation-in-part of application No. 15/335,978, filed on Oct. 27, 2016, now Pat. No. 10,657,814.

(60) Provisional application No. 62/246,787, filed on Oct. 27, 2015.

(51) Int. Cl.
| | | |
|---|---|---|
| *G06T 7/13* | (2017.01) | |
| *G06T 7/194* | (2017.01) | |
| *G06V 20/52* | (2022.01) | |
| *G08G 1/14* | (2006.01) | |

(52) U.S. Cl.
CPC .............. *G06T 2207/30232* (2013.01); *G06T 2207/30264* (2013.01)

(56) References Cited

FOREIGN PATENT DOCUMENTS

| CN | 104637312 A | 5/2015 |
|---|---|---|
| DE | 202006015787 U1 | 3/2007 |

\* cited by examiner

PARKING SPACE DETECTION METHOD AND SYSTEM

PRIORITY

This application is a continuation of U.S. patent application Ser. No. 15/956,375, filed Apr. 18, 2018, which is a continuation-in-part of U.S. patent application Ser. No. 15/335,978, filed on Oct. 27, 2016, now U.S. Pat. No. 10,657,814 B2, which claims the priority benefit of U.S. Provisional Application No. 62/246,787, filed on Oct. 27, 2015, wherein each of which is hereby incorporated herein by reference in its entirety.

FIELD

The present invention relates generally to parking systems and, more particularly, to methods, systems and devices for automatically detecting the presence of a vehicle in a parking space with a high degree of accuracy.

BACKGROUND

Smart parking meter systems have been developed, such as those disclosed in U.S. Pat. Pub. Nos. 2014/0214499 A1 and 2014/0214500 A1 (which are both incorporated herein by reference in their entirety herein), which can monitor a given parking space for violations and automatically issue a citation electronically if a violation occurs. In order for such smart parking meters to operate automatically, they must have the ability to detect when a vehicle enters and leaves the parking space being monitored. Attempts to use in-ground sensors have been made. Alternatively, attempts have been made to use the images collected by the smart parking meter's camera(s) to determine vehicle presence. Both methods have drawbacks.

In-ground sensors typically sense magnetic field strength. For example, the sensor is embedded in the roadway above the location where a vehicle would be parked. When a vehicle is parked over the sensor, the magnetic field increases above a pre-set threshold value, which causes the meter to conclude that a vehicle is present in the monitored space.

A vehicle leaving the parking space is determined in the similar, but opposite manner. The magnetic field drops below a pre-set threshold, which is read by the meter as a change of state to indicate a vehicle leaving the monitored space.

Unfortunately, the in-ground magnetic sensors are prone to magnetic bouncing, which is where the magnetic field reading fluctuates due to a variety of factors. For example, a large industrial truck, such as a plow, driving by on the street next to the parking space will cause an increase and then a decrease in the measured magnetic field. This can cause the meter to correspondingly incorrectly determine that the parked vehicle has left the parking space and then re-entered the space. As a result, the vehicle could be issued a ticket even though it never moved. Weather can similarly affect the operation of the magnetic in ground sensors. Applicant has found that the in-ground magnetic sensors are only about 92-93% accurate.

Employing machine vision using the cameras on the meters poses problems as well. For example, machine vision at night or in rain or snow is less reliable, and sun angles reflecting off of vehicles and shining into the cameras can cause reading anomalies. The cameras can also become covered with snow or dirt, which compromises their ability to read vehicle presence.

Thus, there is a need to provide improved automated vehicle detection systems and methods.

SUMMARY

Disclosed are devices, systems and methods for managing parking monitoring and enforcement. In one aspect, an in ground sensor provides a first vehicle detection technique and a video camera employing machine vision provides a second vehicle detection technique. A vehicle detection technique for a smart parking meter utilizes both of the first and second detection techniques to make a highly accurate determination of a vehicle entering a parking space and a vehicle exiting a parking space. The second detection technique can be used to perform a double check on the first technique, or vice versa.

The disclosure includes a method of determining whether a vehicle is present in a parking space. The method can include monitoring the parking space with a first vehicle detection technique, monitoring the parking space with a second vehicle detection technique, and concluding that the vehicle is present in the parking space only when both of the first and second vehicle detection techniques indicate that the vehicle is present in the parking space.

The parking space can be monitored with a third vehicle detection technique that is different than the first and second vehicle detection techniques.

A conclusion that a vehicle has entered or left the parking space can be determined upon a agreement of the multiple techniques employed.

The disclosure includes a method of determining whether a vehicle is present in a parking space. The parking space can be with a first vehicle detection technique utilizing image processing. The parking space can be monitored with a second vehicle detection technique that does not utilize image processing. The parking space can be further monitored with a third vehicle detection technique that is different than the first and second vehicle detection techniques. More than three vehicle detection techniques can also be utilized.

It can be concluded that the vehicle is present in the parking space only when all of the first and second vehicle detection techniques indicate that the vehicle is present in the parking space. It can also be concluded that the vehicle is not present in the parking space only when all of the first and second vehicle detection techniques indicate that the vehicle is not present in the parking space. Alternatively, only a majority of the techniques utilized need to be in agreement for a state change of the vehicle to be concluded.

The first vehicle detection technique can include performing a background subtraction technique to an image of the parking space. The second vehicle detection technique can include sensing a radar signature change with a radar sensor. The third vehicle detection technique can include performing an edge detection technique to an image of the parking space. The image can be a video feed of the parking space captured by the camera.

The radar sensor can be provided to a housing of a parking meter that is mounted adjacent to the parking space. The radar sensor can also be mounted on or disposed in a pole mounting adjacent to the parking space. The pole can be the same pole on which the parking meter is disposed or on a separate pole.

The disclosure further includes a parking space monitoring system that includes a first parking sensor disposed adjacent to a parking space and configured to sense a change of state due to a vehicle entering or leaving the parking space, a second parking sensor disposed adjacent to the parking space, and a processor coupled to the first parking sensor and the second parking sensor. The second parking sensor can be a video camera oriented to image video of at least a portion of the parking space.

The processor can be coupled to a physical memory (or include such memory onboard) with software code stored in the physical memory. The software code is executable by the processor.

The first parking sensor is configured to provide a reading to the processor indicative of the vehicle's presence or absence in the parking space. The processor is configured via the software code to perform a first machine vision analysis of the imaged video from the camera to determine whether the vehicle has entered or left the parking space. The processor can be configured via the software code to perform a second machine vision analysis of the imaged video from the camera to determine whether the vehicle has entered or left the parking space. The processor is configured via the software code to evaluate the reading from the first parking sensor to determine whether the vehicle has entered or left the parking space. Additional vehicle detection sensors and means can also be provided.

The processor is also configured via the software code to conclude that a vehicle has entered or left the parking space only if the determinations of the first and second machine vision analyses and the reading from the first parking sensor are in concordance.

The first parking sensor can be a radar sensor or other non-optical sensor such as a magnetic sensor, sonar sensor, etc. The machine vision analyses can be background subtraction and edge detection techniques performed on the imaged video of the parking space.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1A:
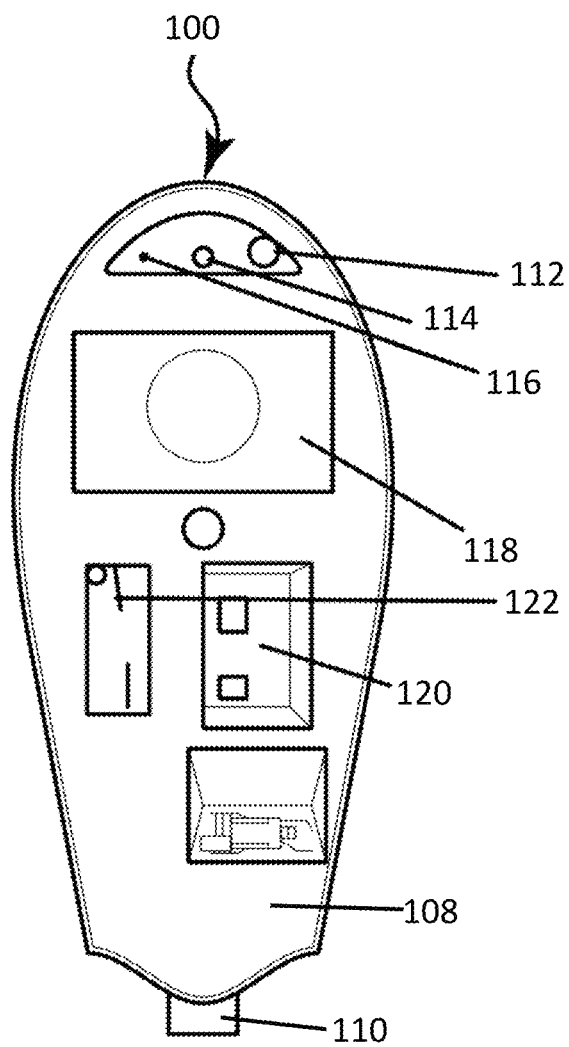
FIGS. 1A and 1B are front and back views, respectively, of a smart parking meter according to certain example embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Referring to FIGS. 1A, 1B, 2 and 3, smart parking meters 100, such as those disclosed in U.S. Pat. Pub. Nos. 2014/0214499 A1 and 2014/0214500 A1 (which are both incorporated herein by reference in their entirety herein), can be deployed adjacent to various parking spaces. Such smart meters can include one or more cameras 102 arranged to monitor parking spaces 104 adjacent to the meter. The cameras 102 can be configured to capture video or still images.

As explained in U.S. Pat. Pub. No. 2014/0214499 A1, the meters 100 include microprocessors, memory and computer code that enable the meters to monitor parking events, including determining the presence of a vehicle 105 in a parking space 104, determining the identity of the vehicle, permitting the parking user to pay for parking time, determining parking violation notices, and other intelligent functions.

A computer readable program code can be stored in the physical memory (e.g., random access memory, flash memory or hard-drive) of the meter. The computer readable program code is configured such that when executed by the microprocessor, the code causes the meter to perform the steps of the invention described herein.

Figure 1B:
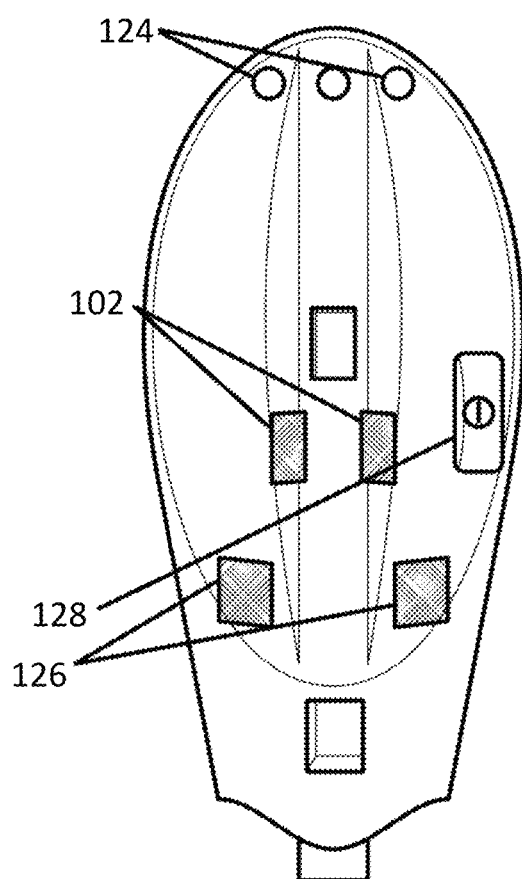

Referring to FIGS. 1A and 1B, each parking meter in certain embodiments includes an enclosure 108 mounted atop a pole 110. The housing 108 includes the electronics components mentioned above. In addition, the housing includes, on the front side, a speaker 112, front-facing camera 114 and microphone 116 disposed adjacent to the graphical user interface (e.g. touch screen) 118. A payment acceptance means 120 and coin slot 122 are also provided. The payment acceptance means can be a contactless or conventional card reader, or other known means for accepting payment.

The rear side of the housing 108 includes a plurality of violation indicator lights 124 windows through which the cameras 102 can see, infrared (IR) illuminators 126 to provide supplemental IR light to aid the cameras' sight, and a lock mechanism 128 to keep unwanted persons from opening the housing 108.

Each of the meters 100 can also be networked with a central or control computer for added control and functionality as explained in U.S. Pat. Pub. No. 2014/0214499 A1. Further, one smart meter 100 can be networked with one or more remote cameras disposed adjacent to additional parking spaces so that one meter can monitor several different parking spaces and parking events.

The same or similar smart parking meter 100 can also be configured as a kiosk and placed adjacent to a parking lot or ramp to monitor entry and exit events at a lot or ramp as explained in U.S. Pat. Pub. No. 2014/0214500 A1. A kiosk can also simultaneously function as a parking space meter. A single kiosk or meter can further be coupled to one or more remote cameras that each monitor individual parking spaces so that the single kiosk or meter monitors multiple individual parking spaces or events throughout a lot, ramp or street segment.

Note that when the term meter is used throughout this application, such use should be understood to include both smart meters and kiosks.

Figure 2:
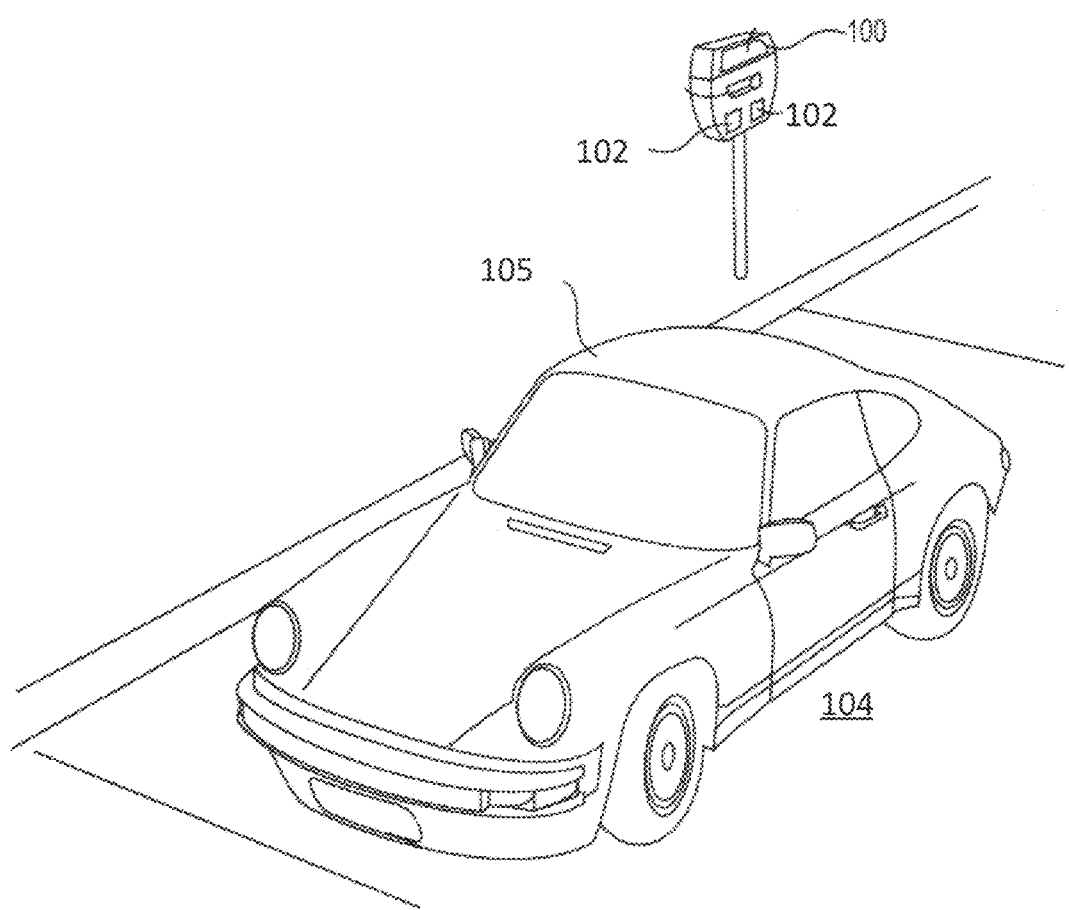
FIG. 2 is a diagram of a vehicle in a parking space being monitored by a smart parking meter according to certain example embodiments.
Figure 3:
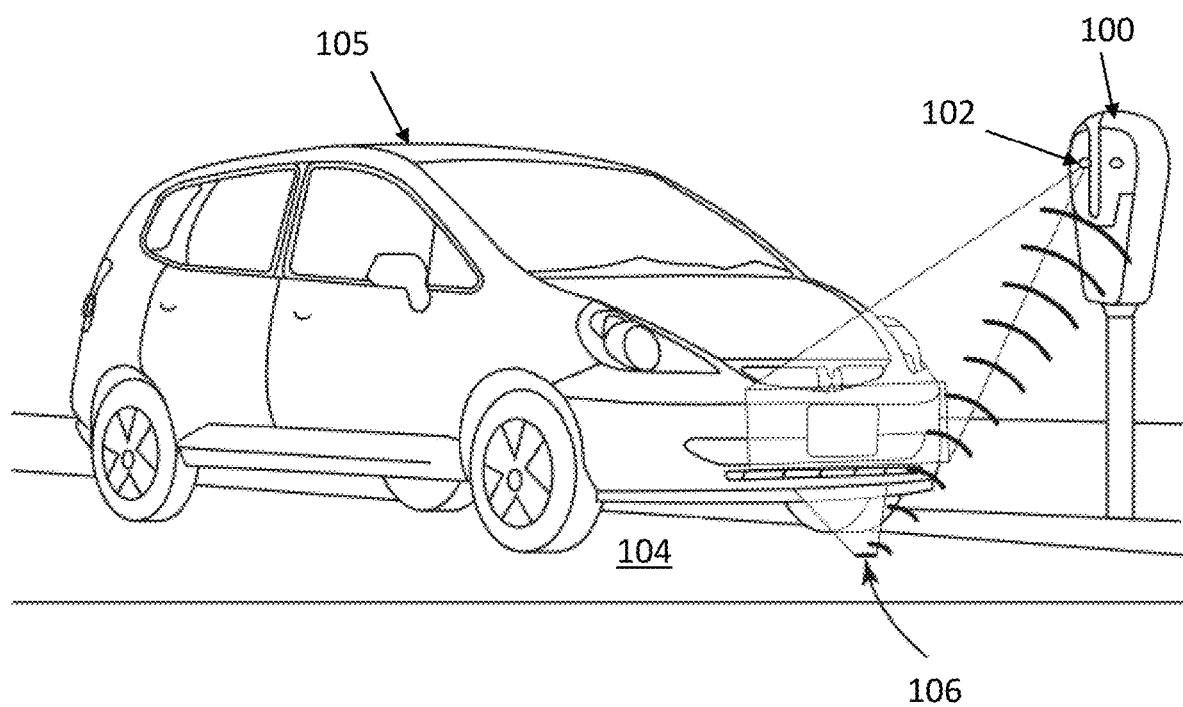
FIG. 3 is another diagram of a vehicle in a parking space being monitored by a smart parking meter according to certain example embodiments.

Referring now to FIGS. 2-3, the smart parking meter 100 includes a camera 102 to view a portion of a vehicle when the vehicle 105 is located in the parking space 104 being monitored. In FIG. 2, the rear side of the vehicle 105 is being viewed by the camera 102. In FIG. 3, the front side of the vehicle 105 is monitored by the camera 102.

In addition, a vehicle sensor 106 is embedded in the road underneath the vehicle 105 when the vehicle is present in the parking space 104. The sensor can be disc-shaped to facilitate embedding in the roadway. The vehicle sensor 106 can also be located in alterative positions such as in the curbing, on a pole adjacent to the parking space (including the same pole as the parking meter 100). The vehicle sensor can also be integrated into the parking meter 100 housing or disposed external to the housing.

The vehicle sensor 106 can use one or more means for sensing a nearby object. For example, the vehicle sensor can be a magnetic sensor or it can utilize radar, sonar, laser, infrared, etc.

The vehicle sensor 106 broadcasts a status message to the nearby meter 100 as shown in FIG. 3. The broadcast can be performed using low power Bluetooth or other short range wireless communications protocol. The broadcast frequency can be continuous or periodic. For example, the status of the vehicle sensor 106 can be broadcast once per second, ten times per second, etc.

In one preferred embodiment, the vehicle sensor 106 is powered by an internal lithium-based battery and a sensing/broadcast cycle is performed once per second in order to conserve battery life. A sensor life expectancy of several years can be achieved using such battery and operating method. In other embodiments, the sensor can be hard-wired for power and/or broadcast.

In embodiments where the vehicle sensor 106 is integrated into, or located adjacent to, the parking meter 100, the sensor can be coupled to the meter 100 via the internal wires (if internal) or via an electrical conduit (if external). The conduit can carry both power and data bi-directionally, or separate power and data conduits can be provided.

The cameras or optical sensors 102 disposed in the parking meter (or remotely from the meter housing as discussed above) use image sensors (e.g. ccd or cmos) and can apply a background subtraction methodology to determine whether a vehicle 105 has entered or left the parking space 104. Note that the background subtraction methodology can also be referred to as foreground subtraction and foreground detection. Edge detection, or other suitable optical sensing means, can be employed in other embodiments for detecting whether a vehicle is present in the monitored parking space.

Figure 4:
FIG. 4 is an image of a parking space being detected for the presence of a vehicle according to certain example embodiments.

An optical vehicle status determination protocol can monitor a segment or window of the image sensor's viewed image. Referring to FIG. 4, a monitored window portion 130 in the lower right quadrant of the total captured image is designated for monitoring as part of the background subtraction technique. Detected objects can also be color-coded on the viewer's screen (at central control) to quickly note progress and lock status.

Note that the vehicle sensor 106 can be seen as a disc-shaped object in FIG. 4 embedded in the roadway.

Figure 5:
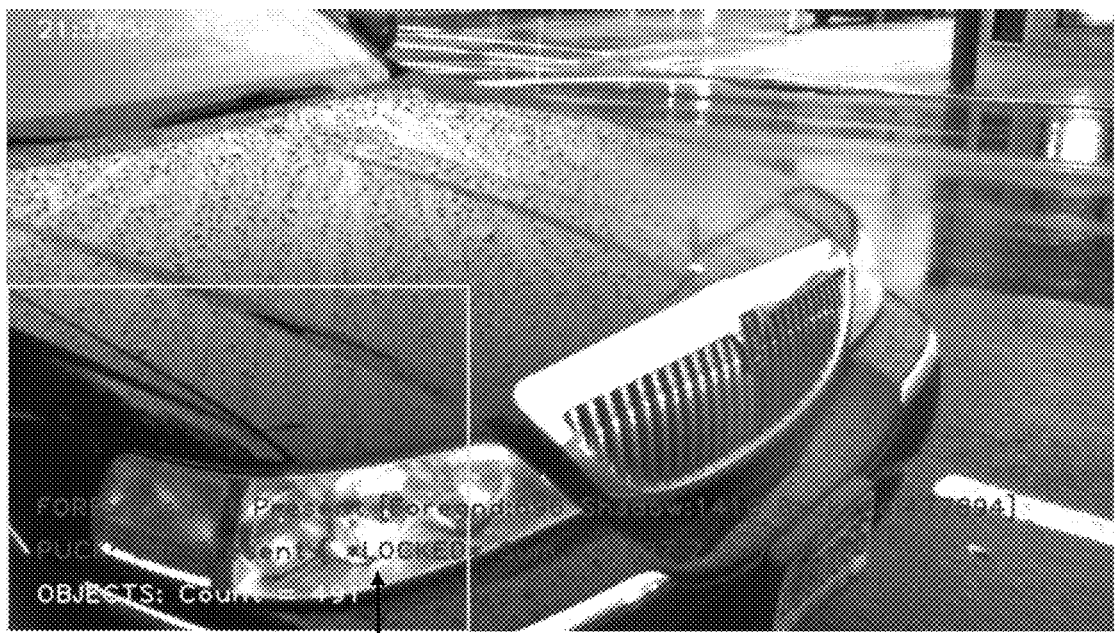
FIG. 5 is another image of a parking space being detected for the presence of a vehicle according to certain example embodiments.

Now referring to FIG. 5, a vehicle is present in the view of the image sensor, and the background subtraction image processing technique is resolving whether a vehicle is present based upon the monitored window portion 130 in the lower left quadrant. The frequency of the background subtraction monitoring employed can be varied. For example, each processor clock cycle, or some other less frequent evaluation can be performed. The result of the background subtraction evaluation is a determination of a state change (e.g., a vehicle entered an open space, or a vehicle left an occupied space).

Figure 6:
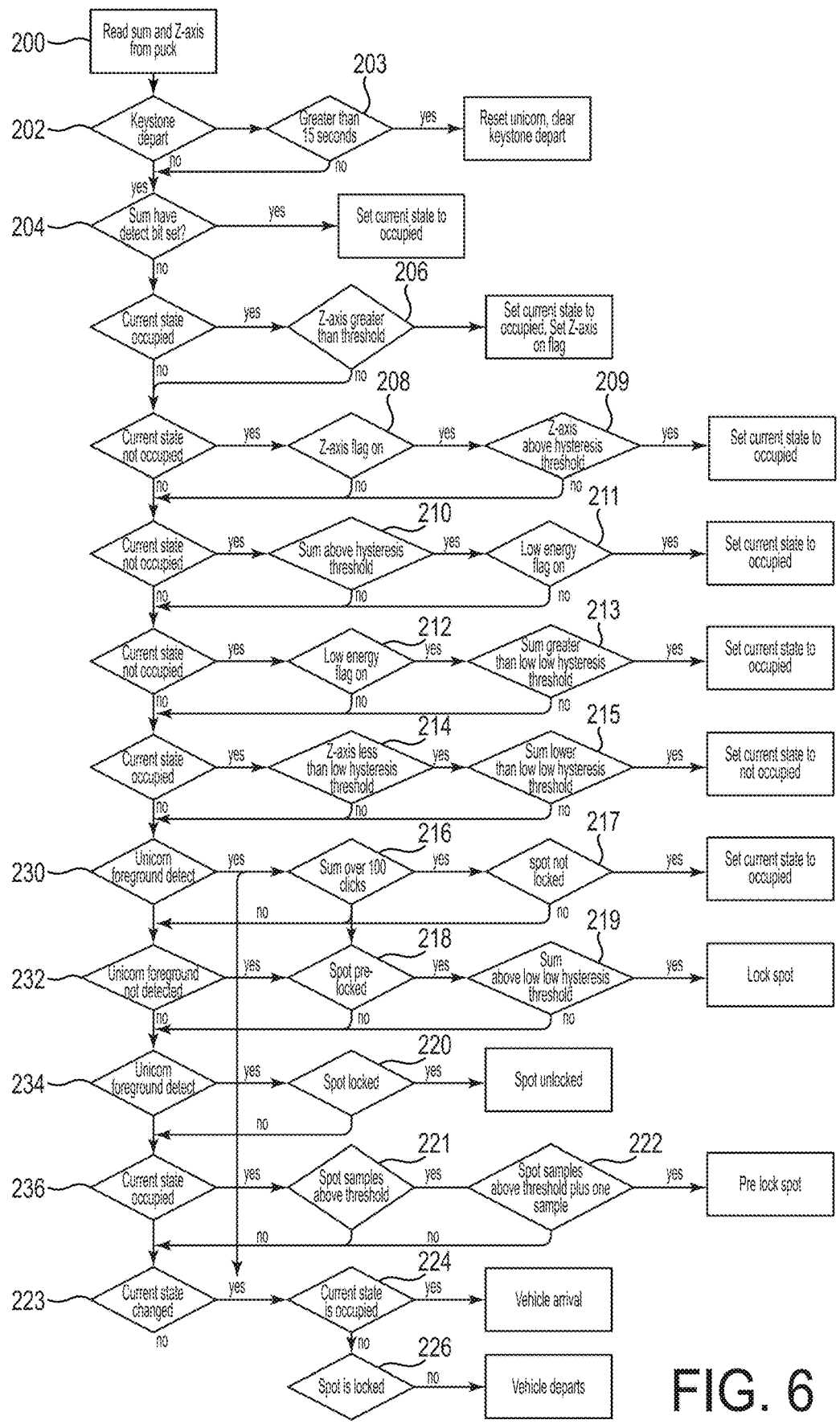
FIG. 6 is a vehicle detection algorithm logic diagram according to certain example embodiments.

Next, the overall vehicle detection algorithm is employed. The detection algorithm, method and technique combine data from the in ground sensor 106 and from the camera 102. FIG. 6 provides a detailed step-by-step breakdown of the algorithm and method. FIG. 6 specifically mentions the magnetic sensor puck. However, it should be understood that other types of sensors in the same or other locations, such as a radar sensor provided to the parking meter, can be used as well.

First, the overall magnetic field strength "sum" is read from the vehicle sensor 106 in step 200 along with the magnetic field strength in the "z-axis" (vertical direction normal to the parking surface). Then in steps 202 and 203, it is determined by the magnetic sensor 106 whether the parking space 104 has been vacated and stayed vacant for more than 15 seconds. If yes, then the state of the camera-based computer vision technique(s) (image sensing algorithm—referred to as "Unicorn" in FIG. 6) is set to a "departed" state. But if the determination by the data provided by the vehicle magnetic sensor 106 is no and the magnetic field reading is above a pre-set threshold in step 204, then the current state of the parking space is determined to be occupied.

Next, a series of double check queries are performed by the processor in the parking meter as part of the algorithm to ensure that no false positive or false negative state determinations have been made by the in ground sensor 106. A query 206 is performed to confirm that the magnetic sensor's Z-axis reading is greater than a pre-set threshold. The processor also determines whether the magnetic sensor's Z-axis flag is on 208, whether the Z-axis reading is above a hysteresis threshold 209, whether the Sum value is above a hysteresis threshold 210, whether the low energy flag has been set to "on" 211 and 212, whether the Sum value is greater than a low low hysteresis threshold 213, whether the Z-axis value is less than a low low hysteresis threshold 214 and whether the Sum value is lower than the low low hysteresis threshold 215. These queries by the processor check various parameters and states of the vehicle sensor's

106 readings and state to ensure that a valid parking space state change is being set by the overall system.

Next, the processor performs a series of queries involving the machine vision evaluation of the parking space to ensure that a conclusion regarding the occupancy state of the parking space being evaluated is reached with a high degree of certainty. In FIG. 6, if the machine vision detection determines that the space is occupied by a vehicle 230, then the Sum value sensed by the magnetic sensor 106 is evaluated to see if it is over a 100 click threshold 216 and it is determined whether the machine vision is in a locked status 217. Next, if the machine vision detection determines that the space is not occupied by a vehicle 232, then the machine vision analysis is evaluated to a pre-locked status 218 and the Sum value sensed by the magnetic sensor 106 is evaluated to see if it is above the low low hysteresis threshold 219.

The determinations for parking space locking 220 and pre-locking are also explained in FIG. 6. Once the machine vision detects that the space is occupied 234, a positive lock status 220 is changed to unlocked. If the current conclusion of the system is that the parking space state is occupied 236 and the samples taken by the machine vision analysis are above a pre-set threshold 221 and above that threshold plus one, then the status is set to pre-locked.

The queries above are double-checks to using the machine vision evaluation to ensure that the determination made from the vehicle sensor is confirmed. If any of these double-check queries fails to confirm the initially determined state, then the current state is changed 223 and the algorithm iterates again. The specific outcome of these determinations described above is provided in FIG. 6

A vehicle is determined to be arriving 224 if the current state is "occupied" and a subsequent valid iteration of the algorithm determines that the state has changed from "unoccupied" to "occupied". The reverse is true for determining a vehicle departure 226.

Figure 7:
FIG. 7 is an image of a parking space being detected for the presence of a vehicle according to certain example embodiments.

An edge detection means for detecting a vehicle's presence will now be described with reference to FIGS. 7-8. Referring to FIG. 7, a monitored window portion 132 of the total captured image is designated for monitoring as part of the edge detection technique. The monitored window 132, or detected objects, can also be color-coded on the viewer's screen (at central control) to quickly note progress and lock status.

Figure 8:
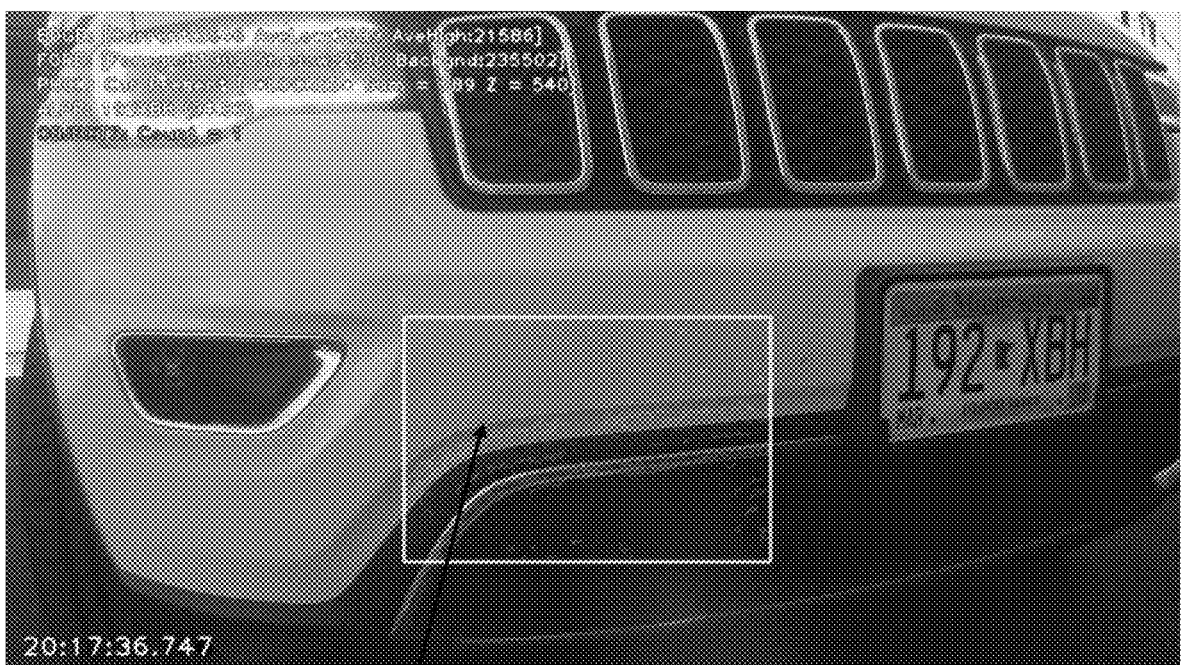
FIG. 8 is another image of a parking space being detected for the presence of a vehicle according to certain example embodiments.

Now referring to FIG. 8, a vehicle is present in the view of the image sensor, and the edge detection image processing technique is resolving whether a vehicle is present based upon the monitored window portion 132. The frequency of the edge detection monitoring employed can be varied. For example, each processor clock cycle, or some other less frequent evaluation can be performed. The result of the edge detection evaluation is a determination of a state change (e.g., a vehicle entered an open space, or a vehicle left an occupied space).

The processor can also change the camera exposure settings depending on lighting conditions so that the image or video being captured is optimized. An ambient light sensor can be provided or the processor can determine the ambient light from the image sensor used to capture the image.

Figure 9A:
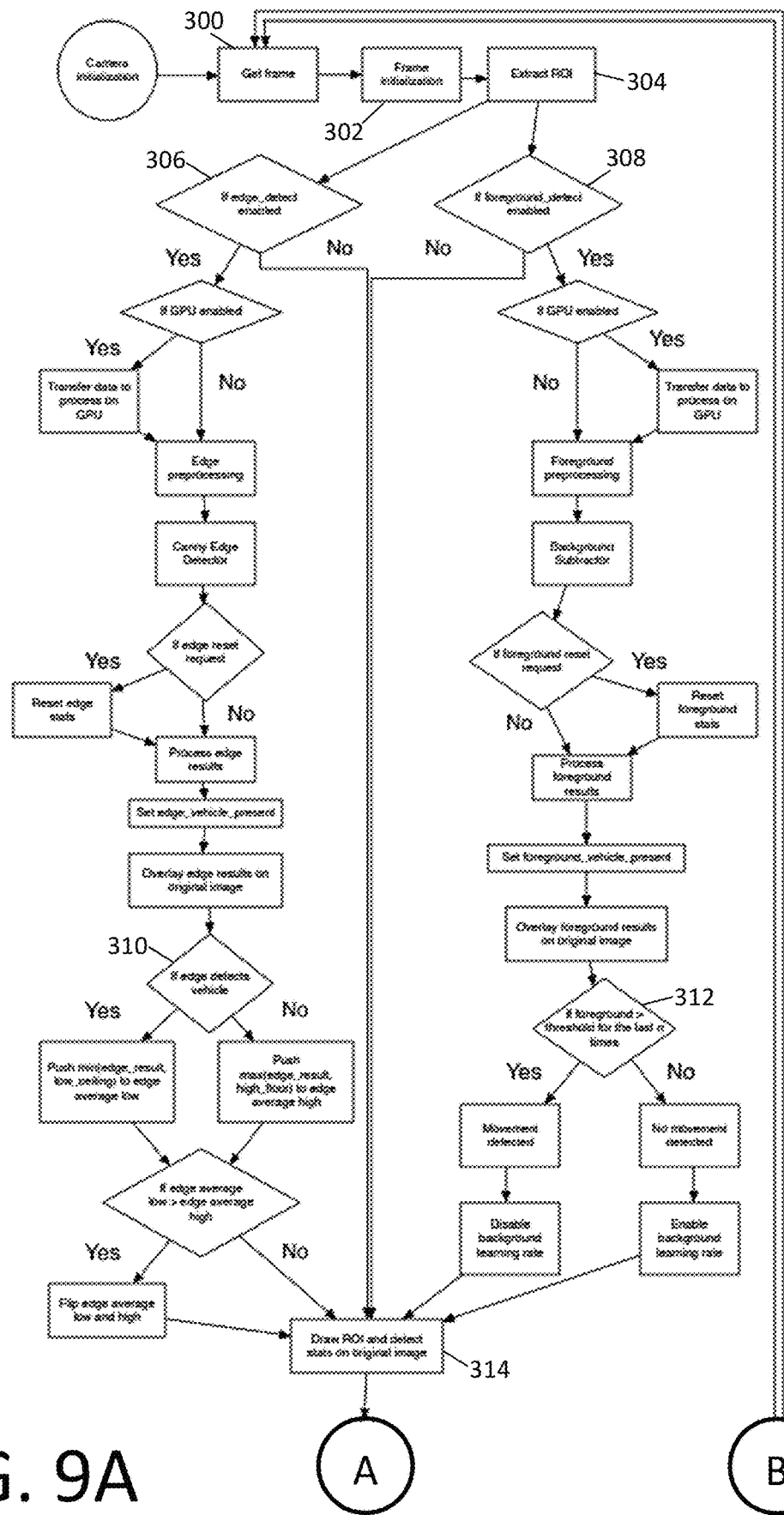
FIGS. 9A-9B are a vehicle detection logic diagram according to certain example embodiments.
Figure 9B:
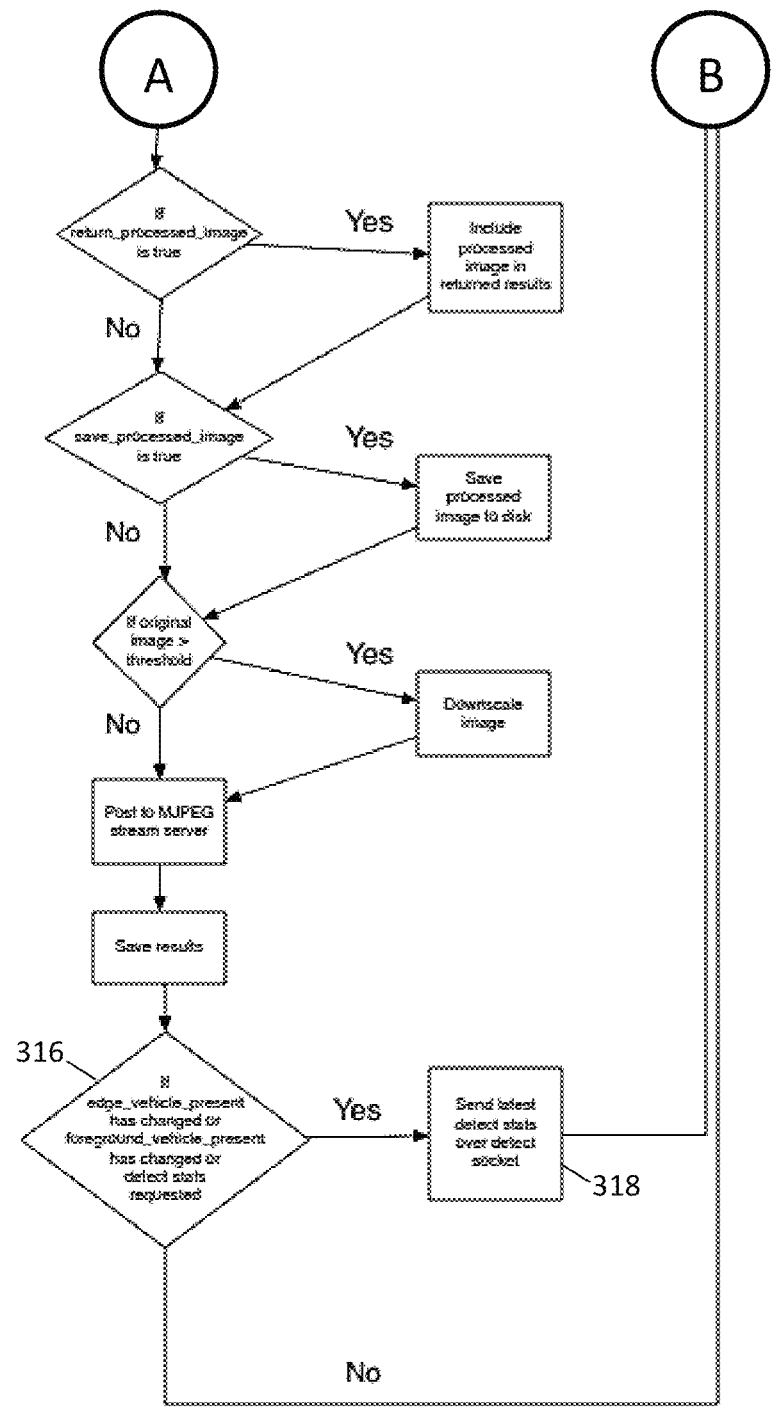

FIGS. 9A-9B show a vehicle detection logic diagram that employs two different machine vision techniques. In step 300, a frame from the video feed from the camera facing the parking space is obtained. The frame is then initialized 302 and a rectangle of interest (ROI) is extracted 304. Then each of the two different detection techniques are performed on the extracted ROI. In this case, the extracted ROI is analyzed using an edge detection technique 306 and a foreground detection technique 308. Note that foreground detection and background subtraction are two different terms referring to the same technique.

Other detection techniques can also be used in place of (or in addition to) either of the techniques of FIGS. 9A-9B. For example, cognitive-based visual recognition techniques can be performed on images of the parking space so that the machine can determine whether the space is empty or occupied. Algorithms can be employed, for example, to recognize color change, shape change, etc. Other cognitive techniques can be utilized as well.

The system reaches independent decisions on whether a vehicle has been detected in the monitored parking space using the edge detection technique 310 and the foreground detection technique 312. In step 314, the ROI is drawn over the original image with detection stats. The processed image and stats are then saved to memory.

In step 316, the vehicle state change decision is made. In this instance, the state change of the vehicle in ten monitored parking space is determined to be a yes if either of the detection techniques returns a result indicating a state change has occurred. Alternatively, the two techniques could be required to be in agreement for the state change to be deemed to have occurred.

If a state change has occurred, then that decision is reported to the processor 318 followed by returning to step 300 where a new image is captured and the analysis iterated. If a state change is determined to not have occurred, then the process begins again at step 300 where a new image is processed.

The processor utilizes the visual vehicle detection determination 318 in combination with the non-visual determination from a non-optical sensor, such as described with regard to FIG. 6, to arrive at a determination of whether a vehicle By combining two or more state determinations and sensing data from both the vehicle sensor 106 and the machine vision analysis using the image sensor 102, a high degree of confidence can be formed for achieving the correct state of vehicle occupancy in a parking space. Thus, the occurrence of false readings as compared to the conventional techniques can be greatly reduced or eliminated. Reducing false readings ensures that parking revenue is maximized and that there is no false issuance of parking tickets and the ill will associated with the same.

Multiple techniques can also be used as primary and secondary determinations. For example, two machine vision techniques can be employed, such as edge detection and background subtraction. If these two techniques result in a disagreement, then a secondary technique, such as a cognitive analysis of the image, can be employed to break the tie. Thus, the cognitive analysis would be employed as a secondary analysis means only when a tie amongst the primary detection means occurs.

Multiple non visual detection techniques can also be employed in certain embodiments. For example, both a magnetic sensor and a radar sensor can be employed. Machine vision detection techniques can be employed in addition to these multiple non-machine vision techniques. The determinations of each technique can be weighted so that a determination can be made in the event of a mixed result of the primary techniques employed, or a tie-breaker or secondary technique can be employed as discussed above.

Figure 10:
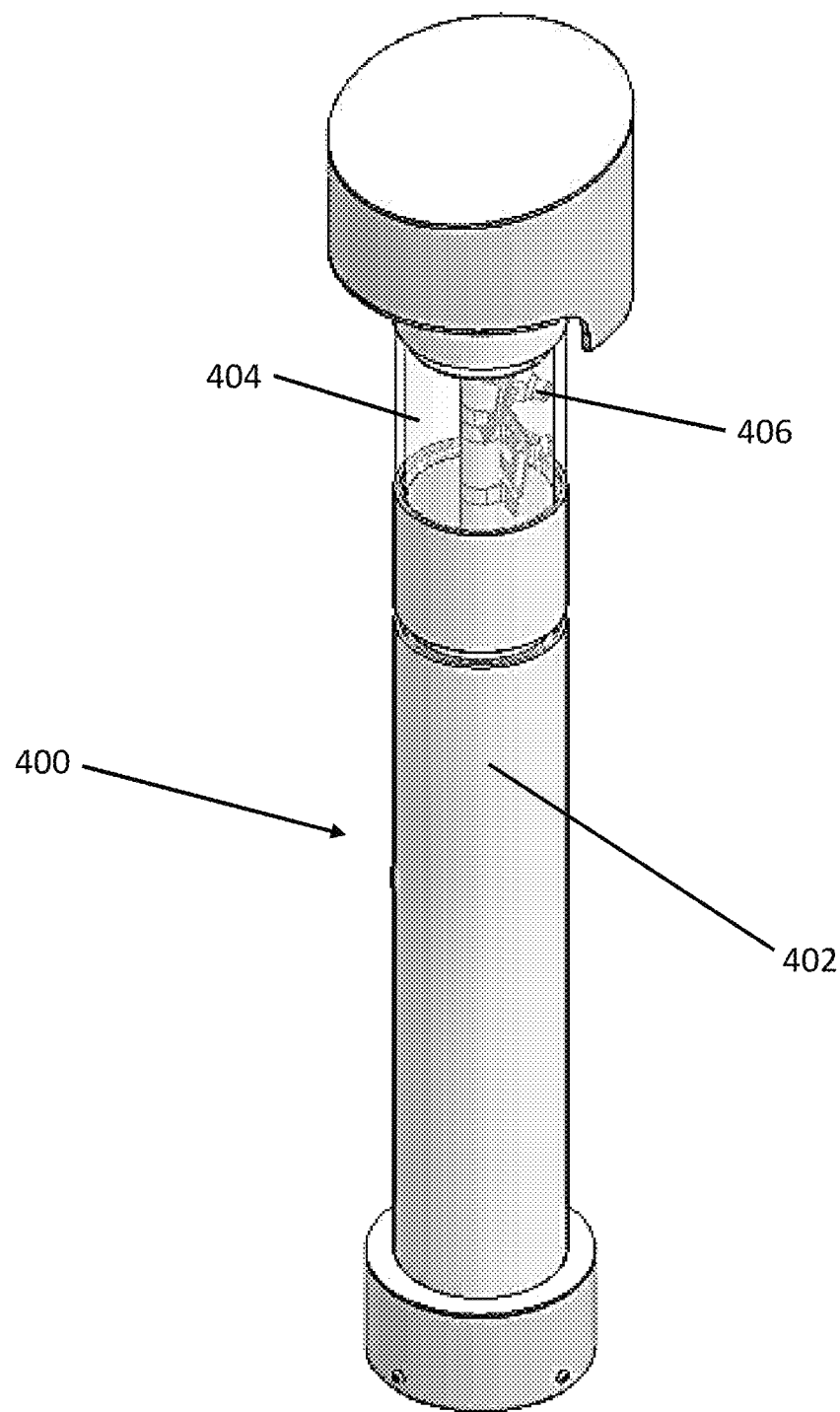
FIG. 10 is a perspective view of a parking bollard according to certain example embodiments.

Referring to FIG. 10, the present invention can be embodied, for example, in the form of a parking bollard 400. The bollard 400 can be used in conjunction with a parking meter, or it can be used to enforce a "no parking" condition in an area monitored by the bollard. That monitored area is potentially any area within range of the sensors provided to the bollard.

The bollard generally comprises an outer enclosure 402 with the electrical and sensing components, such as the processor, memory and sensor are disposed inside of the enclosure. A portion of the enclosure can be transparent (or semi-transparent) which defines a window 404 so that the camera used for the machine vision techniques can see through to the area being monitored. The outline of the cameras 406 can be seen in FIG. 9 through the window 404.

One or more of the sensors can also be located remote from the enclosure 402 in a further alternative embodiment.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A vehicle presence monitoring system, comprising:
a video sensor that is configured to sense a change of state due to a vehicle entering or leaving a monitored area;
a non-video sensor that is configured to sense a change of state due to the vehicle entering or leaving the monitored area;
a processor coupled to the video sensor and the non-video sensor, the processor further coupled to a physical memory and software code stored in the physical memory, the software code being executable by the processor,
wherein the processor is configured via the software code to perform a machine vision analysis of video from the video sensor to determine whether the vehicle has entered or left the monitored space,
wherein the processor receives an output value from the non-video sensor that the processor is configured to determine whether the vehicle has entered or left the monitored space, and
wherein the processor is configured to conclude that the vehicle is present in the monitored area only when both of the machine vision analysis and the determination from the non-video sensor indicate that the vehicle is present in the monitored area.

2. The system of claim 1, wherein the non-video sensor is a radar sensor.

3. The system of claim 1, wherein the video sensor is a camera.

4. The system of claim 1, wherein the machine vision analysis is a background subtraction technique.

5. The system of claim 1, wherein the machine vision analysis is an edge detection technique.

6. The system of claim 1, wherein the video sensor is provided a housing of a parking meter or bollard, and the non-video sensor is disposed adjacent to the monitored space.

7. The system of claim 1, wherein the video sensor and the non-video sensor are both disposed adjacent to the monitored space.

8. The system of claim 1, wherein the monitored space is a parking space.

9. The system of claim 1, wherein the monitored space is a no parking space.

10. The system of claim 1, wherein the processor is configured to concluding that a vehicle state has changed only if the vehicle state persists unchanged for a predetermined length of time.

11. The system of claim 1, wherein the processor is configured to concluding that a vehicle state has changed only if the vehicle state persists unchanged for a predetermined length of time.

12. A method of determining whether a vehicle is present in a no parking space, the method comprising:
monitoring the no parking space with a first vehicle detection technique utilizing image processing;
monitoring the no parking space with a second vehicle detection technique; and
concluding that the vehicle is present in the no parking space only when both of the first and second vehicle detection techniques indicate that the vehicle is present in the no parking space.

13. The method of claim 12, wherein the step of monitoring the no parking space with the first vehicle detection technique comprises performing a background subtraction technique to an image of the no parking space.

14. The method of claim 12, further comprising:
providing the radar sensor to an enclosure of a parking bollard; and
mounting the parking bollard adjacent to the parking space.

15. The method of claim 12, wherein the step of monitoring the no parking space with the first vehicle detection technique comprises performing an edge detection technique to an image of the parking space.

16. The method of claim 12, further comprising monitoring the no parking space with a third vehicle detection technique that is different than the first and the second vehicle detection techniques, wherein the step of monitoring the no parking space with each of the first and third vehicle detection techniques comprises performing a machine vision analysis of the parking space with a camera.

17. The method of claim 12, wherein the step of monitoring the no parking space with the first vehicle detection technique comprises sensing a vehicle presence with a non-image based sensor.

18. The method of claim 17, further comprising concluding that the vehicle is present in the parking space only when all of the first, second and third vehicle detection techniques indicate that the vehicle is present in the parking space.

19. A parking bollard, comprising:
a video sensor disposed inside of an enclosure of the bollard, the sensor being configured to sense a change of state due to a vehicle entering or leaving a monitored area;
a non-video sensor that is configured to sense a change of state due to the vehicle entering or leaving the monitored area;
a processor disposed inside of the enclosure of the parking bollard, the processor coupled to the video sensor and the non-video sensor, the processor further coupled to a physical memory and software code stored in the physical memory,
the software code being executable by the processor, wherein the processor is configured via the software code to perform a machine vision analysis of video from the video sensor to determine whether the vehicle has entered or left the monitored space, wherein the processor receives an output value from the non-video sensor that the processor is configured to determine whether the vehicle has entered or left the monitored space, and wherein the processor is configured to conclude that the vehicle is present in the monitored area only when both of the machine vision analysis and the determination from the non-video sensor indicate that the vehicle is present in the monitored area.

20. The bollard of claim 19, wherein the machine vision analysis is a background subtraction technique and/or an edge detection technique.

\* \* \* \* \*